(12) United States Patent
Iizuka

(10) Patent No.: US 6,202,015 B1
(45) Date of Patent: Mar. 13, 2001

(54) HYDRAULIC CONTROL SYSTEM OF AUTOMATIC TRANSMISSION

(75) Inventor: Naonori Iizuka, Fuji (JP)

(73) Assignee: Jatco Corporation (JP)

( * ) Notice: Subject to any disclaimer, the term of this patent is extended or adjusted under 35 U.S.C. 154(b) by 0 days.

(21) Appl. No.: 09/201,357

(22) Filed: Dec. 1, 1998

(30) Foreign Application Priority Data

Dec. 1, 1997 (JP) .................................................. 9-330296

(51) Int. Cl.$^7$ .................................. G06F 7/00; F02C 7/36
(52) U.S. Cl. ................................. 701/51; 477/31; 477/34; 477/37; 477/116; 477/117; 477/156; 475/31; 192/3.51
(58) Field of Search ........................... 701/51, 52; 477/30, 477/31, 34, 37, 93, 114, 115–117, 156, 169; 475/31, 127; 192/3.51, 218, 103 F, 107 R

(56) References Cited

U.S. PATENT DOCUMENTS

| 4,730,708 | * | 3/1988 | Hamono et al. | 477/114 |
| 5,411,451 | * | 5/1995 | Ando et al. | 477/144 |
| 5,813,943 | * | 9/1998 | Kousaka et al. | 477/156 |

* cited by examiner

Primary Examiner—William A. Cuchlinski, Jr.
Assistant Examiner—Yonel Beaulieu
(74) Attorney, Agent, or Firm—Rossi & Associates

(57) ABSTRACT

In an automatic transmission of a motor vehicle, in which a hydraulic pressure is supplied to a piston of a friction element is maintained at a first level that is lower than a given level at which the friction element is engaged, while the vehicle that is in a forward-drive range is being stopped, when the range of the automatic transmission is changed from a neutral range to the forward-drive range the hydraulic pressure having a second level that is higher than the first level is supplied to the piston of the friction element until a completion of the stroke of the piston is detected. The stroke completion of the piston is judged based on a predetermined difference between a turbine speed of the automatic transmission detected upon the change of the range and a current turbine speed.

3 Claims, 3 Drawing Sheets

HYDRAULIC CONTROL SYSTEM OF AUTOMATIC TRANSMISSION

BACKGROUND OF THE INVENTION

1. Field of the Invention

The present invention relates to a hydraulic control system of an automatic transmission of a motor vehicle.

2. Description of the Prior Art

A known example of hydraulic control system of an automatic transmission is disclosed in Japanese laid-open Patent Publication No. 62-18336. In this hydraulic control system, a creep preventive device controls a solenoid for neutral control when the position of the select lever is changed from a neutral range to one of forward-drive ranges, so that the line pressure is supplied as it is to a start clutch (forward-drive friction engaging element) until a piston stroke is completed. After the piston stroke is completed, the clutch engaging pressure supplied to the start clutch is reduced or the supply of the pressure is temporarily stopped, so that the pressure of the start clutch is controlled to a low level at which the clutch does not have an engaging capacity.

With this arrangement, the vehicle is prevented from creeping while it is in one of drive ranges, and the supply of the line pressure can always be finished at a point of time when the start clutch is placed in the same engaging condition, thereby preventing an engaging shock and racing of the engine.

In the known hydraulic control device of the automatic transmission, however, the completion of the piston stroke is determined when a difference between the engine rotating speed and the turbine rotating speed detected at a certain moment becomes larger than a predetermined value after the range is changed. If the engine speed (Ne) changes due to an increase in the idling speed (idle up) during the piston stroke, therefore, it is possible that the piston stroke of the forward-drive friction engaging element (FWD/C) is judged by mistake as being finished at a point of time when the difference between the engine speed and the turbine speed (Nt) is increased, as shown in FIG. 4, even though the real piston stroke is not finished yet. In this case, the supply of the pressure to the start clutch is stopped or reduced. If the driver tries to start the vehicle at the time when the judgement is made by such mistake, an engaging shock or racing of the engine occurs due to a delay in engagement of the forward-drive friction engaging element, and the vehicle may not be smoothly or readily started.

SUMMARY OF THE INVENTION

The present invention was developed so as to solve the above-described problem, by relating detection of the piston stroke, only with the turbine speed. Namely, the present invention provides a hydraulic control system of an automatic transmission of a motor vehicle, which includes a friction element (15) that is engaged when the vehicle is in a forward-drive range, and detecting means (forward-drive friction element piston stroke detecting means) (22) for detecting a stroke of a piston of the friction element (15) from a first position for releasing the friction element, to a second position for engaging the friction element, when the range of the automatic transmission is changed from a neutral range to the forward-drive range. The hydraulic control system further includes control means (forward-drive friction element control means (18)) that controls a hydraulic pressure supplied to the piston of the friction element (15), to a first level lower than a given level at which the friction element (15) has an engaging capacity, while the vehicle in the forward-drive range is being stopped. Further, the detecting means (22) for detecting the stroke of the piston of the friction element (15) generates a stroke completion signal (S) to the control means (18) when a difference between a turbine speed (TbnREV0) of the automatic transmission detected upon a change of the range, and a current turbine speed (TbnREV), is larger than a predetermined value (TbnREV1). The control means (18) supplies a hydraulic pressure having a second level that is higher than the first level, to the piston of the friction element (15), until the control means (18) receives the stroke completion signal (S).

The reference numerals in parentheses are those of corresponding elements in one embodiment of the present invention as described later.

If the idling speed of the engine is increased (idle up) during the stroke of the piston of the friction element from the releasing position to the engaging position when the vehicle is changed from the neutral range to the forward drive range, the turbine rotating speed is temporarily increased with a delay, following an increase of the engine speed, but the turbine speed is gradually lowered if the piston is in the middle of the stroke.

By judging completion of the stroke only based on the turbine speed, therefore, a misjudgement on completion of the piston stroke based on the increase of the engine speed due to idle up can be prevented, and the completion of the piston stroke can be more accurately detected. Thus, the hydraulic control system of the present invention can surely avoid engaging shocks and racing of the engine while preventing the vehicle from creeping when the position of the select lever is changed from the neutral range to the forward-drive range.

BRIEF DESCRIPTION OF THE DRAWINGS

The invention will be described in greater detail with reference to a preferred embodiment thereof and the accompanying drawing, wherein.

DETAILED DESCRIPTION OF THE PREFERRED EMBODIMENT

Figure 1:
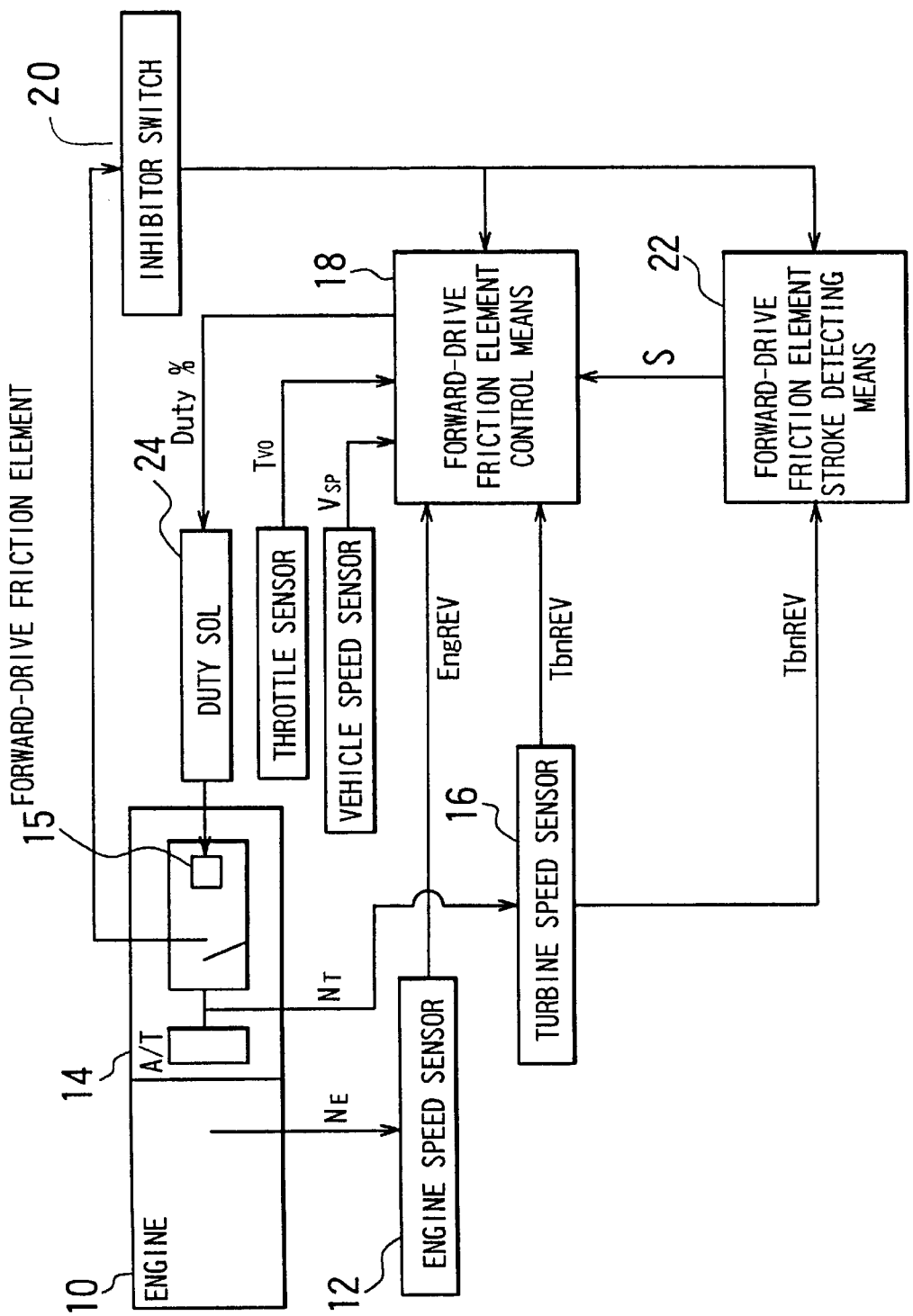
FIG. 1 is a block diagram showing one preferred embodiment of the present invention.

FIG. 1 shows one preferred embodiment of the present invention. An engine speed sensor 12 measures a rotating speed NE of an engine (ENG) 10 of the vehicle, and a turbine speed sensor NT measures a turbine rotating speed NT of an automatic transmission (AT) 14. Forward-drive friction element control means 18 receives signals EngREV and TbnREV that represent the engine speed and the turbine speed, respectively. An inhibitor switch 20 serves to detect a currently selected range of the automatic transmission 14, and a signal indicative of the detected range is received by the forward-drive friction element control means 18 and forward-drive friction element piston stroke detecting means 22. The forward-drive friction element piston stroke detecting means 22 also receives the above-indicated signal TbnREV from the turbine speed sensor 16.

As described later, the forward-drive friction element piston stroke detecting means 22 detects completion of a stroke of a piston of a forward-drive friction element (FWD/C: friction element) 15 of the automatic transmission 14, and generates a detection signal S to the forward-drive friction element control means 18. Based on these input signals, the forward-drive friction element control means 18 generates a control signal Duty% to a duty solenoid for neutral control (DUTY SOL) 24. The duty solenoid for neutral control 24 is provided independently from a base solenoid(not shown) which controls the line pressure in accordance with driving conditions. The duty solenoid for neutral control 24 then controls the level of the line pressure to be supplied to the piston of the forward-drive friction element 15 during neutral control, in accordance with the control signal Duty%.

The forward-drive friction element control means 18 also receives a vehicle speed Vsp detected by a vehicle speed sensor installed on the vehicle, and a throttle opening Tvo detected by a throttle opening sensor.

Figure 2:
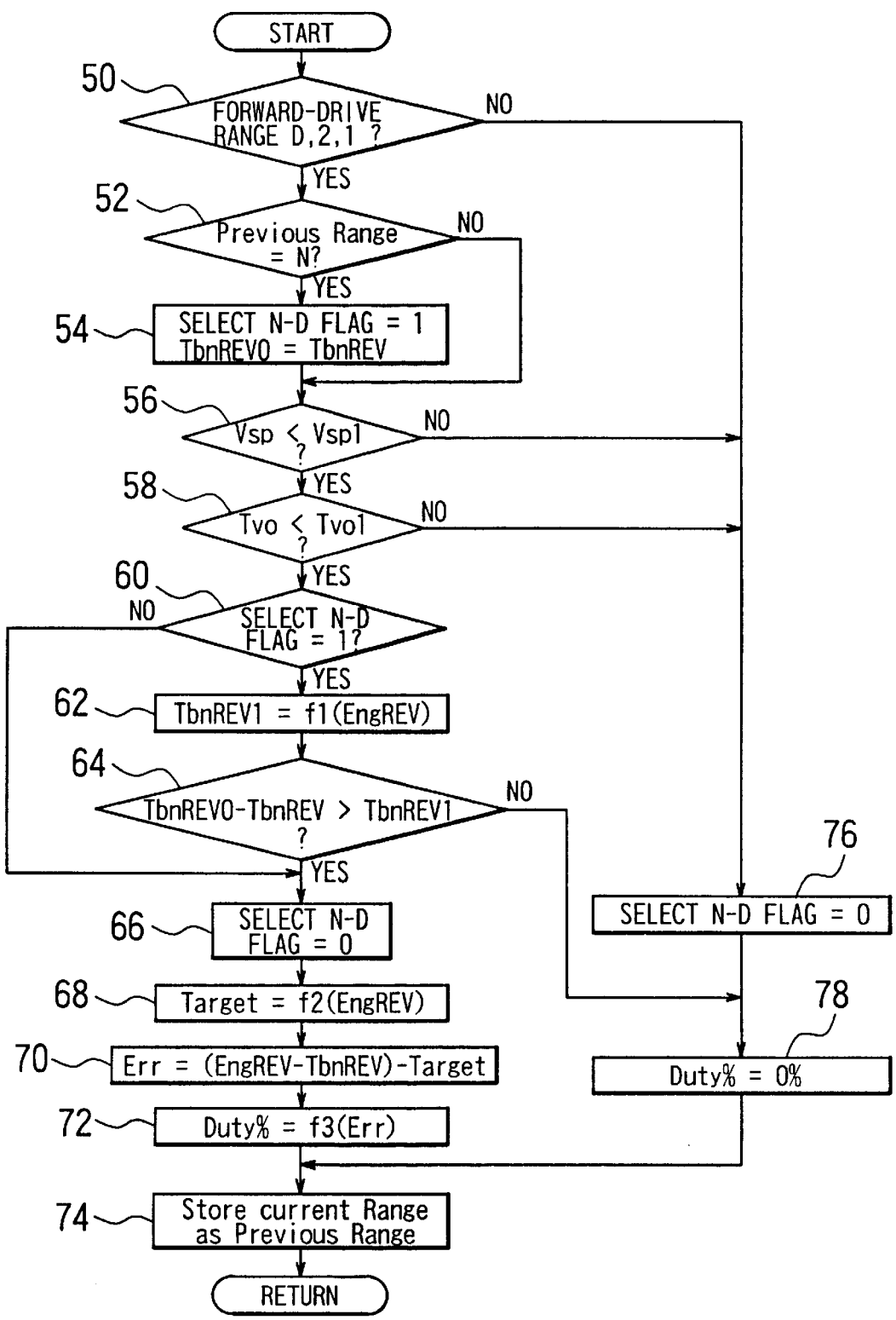
FIG. 2 is a flow diagram showing the operation of the hydraulic control device of the embodiment of FIG. 1.

The operation of the present invention will be now described, with reference to the flow diagram of FIG. 2.

Initially, step 50 is executed to check if the currently selected range detected by the inhibitor switch 20 (FIG. 1) is one of forward-drive ranges (D, 2, and 1 in this embodiment). If a negative decision (NO) is obtained in step 50, namely, if any of N, P and R ranges is being selected, step 76 is executed to set a select N-D flag to "0" for inhibiting neutral control. In next step 78, the duty % of the duty solenoid 24 is controlled to 0%, and the control flow goes to step 74 as described later. If an affirmative decision (YES) is obtained in step 50, step 52 is executed to check if the range stored in the previous cycle is N range or not.

If an affirmative decision (YES) is obtained in step 52, step 54 is executed to set the select N-D flag to "1", and store the turbine speed TbnREV0 detected by the turbine speed sensor 16 immediately after selecting one of the forward-drive ranges. If a negative decision (NO) is obtained in step 52, the control flow goes to step 56 (judgement on the vehicle speed).

In step 56, it is determined whether the vehicle speed Vsp detected by the vehicle sensor is smaller than a preset vehicle speed Vsp1 for neutral control. If a negative decision (NO) is obtained in step 56, the neutral control is inhibited, and the control flow goes to the above-described step 76 to set the select N-D flag to "0", and the base solenoid for controlling the line pressure is controlled in accordance with driving conditions. If an affirmative decision (YES) is obtained in step 56, a suitable vehicle speed condition is established, and the control flow goes to step S58 to make a judgement on the throttle opening. Step 58 checks if the throttle opening Tvo detected by the throttle opening sensor is smaller than a preset throttle opening Tvo1 for neutral control.

If a negative decision (NO) is obtained in step 58, the above step 76 (setting the select N-D flag to "0") and following steps are executed so as to inhibit the neutral control. If an affirmative decision (YES) is obtained in step 58, suitable vehicle speed condition and throttle opening condition are established, and step 60 is executed to check if the select N-D flag is set to "1".

If an affirmative decision (YES) is obtained in step 60, step 62 is executed to calculate a turbine speed TbnREV1 {=f1(EngREV)} used for detecting the piston stroke, based on the current engine speed EngREV measured by the engine speed sensor 12. Here, "f1" is a predetermined first coefficient. If a negative decision (NO) is obtained in step 60, the control flow goes to step 66 to set the select N-D flag as described later.

After execution of step 62, step 64 is executed to check if a difference between the turbine speed TbnREV0 detected immediately after selecting the forward-drive range and the current turbine speed TbnREV is larger than the above-indicated turbine speed TbnREV1 for detecting the piston stroke. If a negative decision (NO) is obtained in step 64, the piston is supposed to be on the way of stroke, thus the neutral control is not adopted, and the control flow goes to the above-indicated step 78 to set the duty % to 0.

If an affirmative decision (YES) is obtained in step 64, the forward-drive friction element piston stroke detecting means 22 determines that the stroke of the piston of the forward-drive friction element 15 has been completed, and generates a completion signal S to the forward-drive friction element control means 18, and step 66 is then executed to set the select N-D flag to "0" to start the neutral control through the following steps.

In the next step 68, the target engine speed Target for neutral control is calculated from the current engine speed EngREV {f2(EngREV)}, where "f2" is a predetermined second coefficient.

Step 70 is then executed to obtain a deviation Err of the target engine speed Target for neutral control, with respect to a difference between the current engine speed EngREV and the current turbine speed TbnREV. Then, step 72 is executed to calculate the duty % {=f3(Err)} of the duty solenoid for neutral control 24 so that this deviation Err becomes equal to "0", and the forward-drive friction element control means 18 controls the duty solenoid 24 based on the duty % thus calculated. Here, "f3" is a predetermined third coefficient.

Finally, step 74 is executed to store the range detected in the current cycle as "range in the previous cycle", and the current control cycle is terminated.

Figure 4:
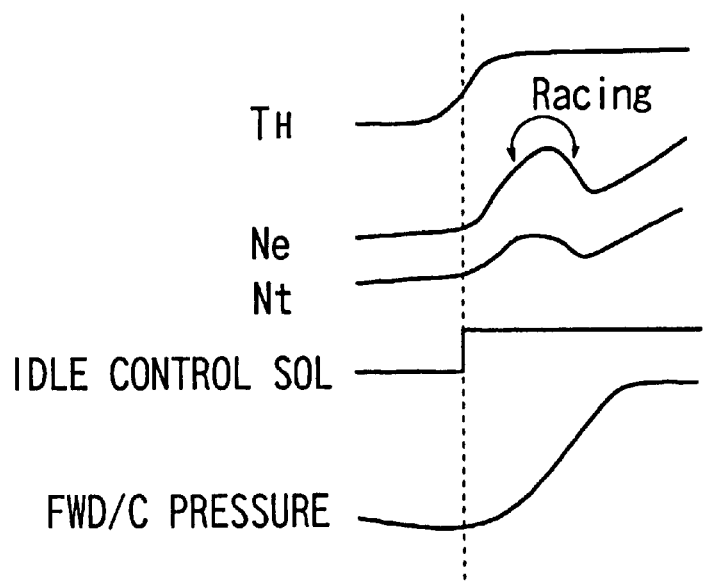
FIG. 4 is a time chart used for preventing racing of the engine in a known hydraulic control device.

In the neutral control as described above, the duty% of the duty solenoid 24 is controlled so that the hydraulic pressure applied to the forward-drive friction element 15 is kept at a low level just below the level at which the friction element 15 has an engaging capacity, namely, the deviation Err is made equal to "0". This is because, if the hydraulic pressure of the forward-drive friction element 15 is controlled to be zero, it takes a lot of time until the forward-drive friction element 15 has an engaging capacity, which results in racing of the engine 10 as shown in FIG. 4. The engine racing may be avoided by suitably controlling the engine, as disclosed in laid-open Japanese Patent Publication No. 3-82638. This method, however, does not solve the problem of engine racing when the engine is in a condition where its output cannot be controlled.

The neutral control is inhibited until the stroke of the piston of the forward-drive friction element 15 is completed, because it takes a relatively long time to charge the friction element 15 and the completion of the piston stroke is delayed if the duty% is set to a small value to apply a low hydraulic pressure to the friction element 15 during the piston stroke. Also, racing of the engine 10 may occur if the accelerator pedal is depressed during the piston stroke.

Figure 3:
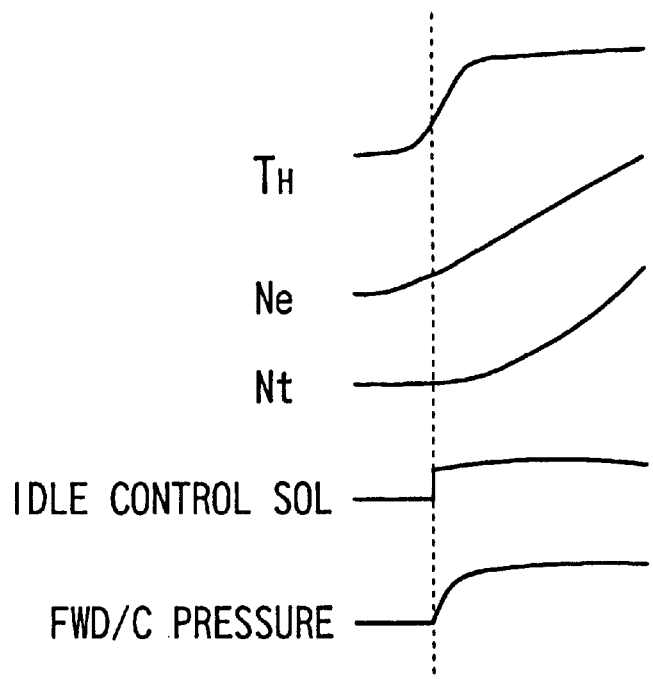
FIG. 3 is a time chart used for preventing racing of the engine in the hydraulic control device of the present invention.

By performing the control as described above, the pressure applied to the forward-drive friction element 15 changes in quick response to duty-ratio control of a solenoid (SOL) for idle control as shown in FIG. 3, and the turbine speed (Nt) of the torque converter also changes smoothly, thus avoiding a sudden change in the rotating speed (Ne) of the engine 10. Thus, racing of the engine 10 can be prevented.

According to the present invention as explained above, neutral control is executed to prevent creeping of the vehicle when the select lever is changed from the neutral range to one of drive ranges, in which control the hydraulic pressure supplied to the friction element which is engaged in a forward-drive range is controlled at a low level just below the level at which the friction element has an engaging capacity, and wherein completion of the piston stroke of the friction element is judged when the difference between the turbine speed of the transmission detected upon the change of the range and the current turbine speed reaches the predetermined value to start the neutral control. Thus, even if the idle up of the engine occurs during the piston stroke, the start timing of the neutral control is not misjudged, so that the engine is prevented from racing and the automatic transmission is prevented from engaging shock of the friction element. And also, since a higher hydraulic pressure is supplied to the friction element up to the start of neutral control as compared with during the neutral control, the piston stroke can be promptly completed.

What is claimed is:

1. A hydraulic control system of an automatic transmission of a motor vehicle, comprising:

a friction element that is engaged when the vehicle is in a forward-drive range;

detecting means for detecting a stroke of a piston of the friction element from a first position for releasing the friction element, to a second position for engaging the friction element, when the range of the automatic transmission is changed from a neutral range to the forwarddrive range, and control means for controlling a hydraulic pressure supplied to the piston of the friction element to a first level that is lower than a given level at which the friction element engages, while the vehicle that is in the forward-drive range is being stopped, wherein said detecting means for detecting the stroke of the piston of the friction element generates a stroke completion signal to said control means when a difference between a turbine speed of the automatic transmission detected upon a change of the range, and a current turbine speed, is larger than a predetermined value, said control means supplying a hydraulic pressure having a second level that is higher than said first level, to the piston of the friction element, until the control means receives the stroke completion signal.

2. A hydraulic control system of an automatic transmission of a motor vehicle, comprising:

a friction element that is engaged when the vehicle is in a forward-drive range;

range detecting means for detecting current range position of the automatic transmission;

engine load detecting means for detecting an engine load;

vehicle speed detecting means for detecting a vehicle speed;

turbine speed detecting means for detecting a turbine speed of the automatic transmission; and neutral control means for controlling a hydraulic pressure supplied to said friction element to a level at which the friction element is not engaged, so as to prevent creeping of the vehicle, while the range position detected by said range detecting means is the forward-drive range, the vehicle speed detected by said vehicle speed detecting means is lower than a predetermined speed, and the engine load detected by said engine load detecting means is lower than a predetermined load;

wherein when the range of the automatic transmission is changed to the forward-drive range from other range said neutral control means starts controlling of said hydraulic pressure at the time when a difference between a turbine speed detected upon the change of the range and a current turbine speed is larger than a predetermined value.

3. A hydraulic control system of an automatic transmission of a motor vehicle as defined in claim 2, further comprising engine speed detecting means for detecting an engine speed;

wherein said neutral control means controls said hydraulic pressure in accordance with a difference between the engine speed detected by said engine speed detecting means and a current turbine speed detected by said turbine speed detecting means, while a change of the range of the automatic transmission is not detected.

\* \* \* \* \*